United States Patent

Rosaen

[15] 3,685,354
[45] Aug. 22, 1972

[54] FLOW INDICATOR DEVICE HAVING PRESSURE BALANCED SEALING SHAFT

[72] Inventor: Nils O. Rosaen, 3774 Quarton Rd., Bloomfield Hills, Mich. 48013

[22] Filed: March 2, 1971

[21] Appl. No.: 120,270

Related U.S. Application Data

[63] Continuation-in-part of Ser. No. 50,651, June 29, 1970.

[52] U.S. Cl. .................73/228, 277/53, 277/74, 310/9
[51] Int. Cl. .............................................G01f 1/00
[58] Field of Search ............73/228, 272; 277/53, 74; 308/9, 36.3

[56] References Cited

UNITED STATES PATENTS

| | | | |
|---|---|---|---|
| 1,315,822 | 9/1919 | Doran | 277/74 |
| 2,018,372 | 10/1935 | Mason | 277/53 X |
| 2,047,854 | 7/1936 | Clymer | 73/228 |
| 3,004,180 | 10/1961 | Macks | 308/9 X |
| 3,282,102 | 11/1966 | Rosaen | 73/228 |

*Primary Examiner*—Richard C. Queisser
*Assistant Examiner*—John P. Beauchamp
*Attorney*—Hauke, Gifford & Patalidis

[57] ABSTRACT

A flow indicator device especially suitable for high pressure applications and having a housing with inlet and outlet ports respectively adapted to be connected with a source of fluid pressure and a fluid user. A semi-circular vane member mounted within the housing is movable in response to a change in the flow rate between the inlet and outlet ports to rotate a shaft to which the vane member is attached. The shaft, in turn, extends externally of the housing and is operatively coupled to an indicator for providing an external visual indication of the rate of flow through the device. The shaft is rotatably mounted in a pair of axially aligned bores in the housing in a balanced fluid sealing relationship by a plurality of spaced substantially U-shaped annular grooves disposed at the opposite ends of the shaft. The fluid fills the grooves around the shaft and provides a continuous film of fluid around the shaft to prevent the shaft from binding when the shaft rotates under the force of the vane member. This permits the shaft to be made to fit more tightly in the housing and thus provides an assembly in which the shaft itself provides the major sealing function. Fluid conduits are provided downstream from the grooves for communicating any fluid leakage along the shaft to a common drain.

6 Claims, 5 Drawing Figures

PATENTED AUG 22 1972　3,685,354

INVENTOR
NILS O. ROSAEN
BY Hauke, Gifford & Patalidi
ATTORNEYS

FLOW INDICATOR DEVICE HAVING PRESSURE BALANCED SEALING SHAFT

CROSS-REFERENCE TO RELATED APPLICATIONS

The present application is a continuation-in-part of U. S. Pat. application Ser. No. 50,651, filed June 29, 1970, for "Fluid Device Having Flow Control and Indicating Means," and the present patent application is related in substance to U. S. Pat. No. 3,282,102, issued Nov. 1, 1966, for "Flow Indicators."

BACKGROUND OF THE INVENTION

I. Field of the Invention

The present invention relates to fluid systems and, more particularly, to a fluid device for indicating the rate of fluid flow through a system, and a new and improved means for providing a pressure balanced seal for such devices.

II. Description of the Prior Art

A variety of measuring instruments and the like are now available for supplying information as to the rate of flow in a fluid system. These instruments may be broadly divided into positive displacement meters and rate meters. In the former type of flow meter, pistons or partitions are displaced by the flowing fluid and a suitable mechanism records or indicates the displacement. In rate meters such as venturi meters and elbow meters, the pressure is measured at various points along a special section of narrow tubing and the amount of flow is calculated from the pressure differential.

Although these various types of measuring devices can be manufactured to provide accurate flow measurements, they are expensive to construct and difficult to operate. As a result, their use is necessarily limited to expensive hydraulic installation for equipment operated by highly skilled personnel.

It has been a problem in such devices to provide a suitable sealing means which will insure a fluid-tight seal around the shaft, while at the same time providing a rate meter which is economical to manufacture. The O-rings commonly used on the shafts for sealing cause friction which interferes with the accuracy of such devices. In high pressure systems where the seals must prevent leakage of fluids under high pressure, this is especially true.

In the aforementioned U. S. Pat. No. 3,282,102, there is disclosed an example of a rate flow indicator which alleviates a number of the heretofore described disadvantages, but which is still not entirely satisfactory for high pressure systems.

The present invention represents an improvement over the invention disclosed and claimed in the aforementioned patent and patent application, in that it provides a flow indicator having a vane member rotatably mounted on a shaft carried in diametrically opposed axially aligned bores within the housing and in which an improved means is provided for sealing and lubricating the shaft that operatively couples an externally mounted indicating means to the internal flow response vane member.

SUMMARY OF THE INVENTION

The present invention, which will be described subsequently in greater detail, comprises a flow indicator device having an inlet port and an outlet port and a flow responsive vane member carried within the housing between the inlet and outlet ports, the flow responsive vane member being operatively coupled to an externally mounted indicator by means of a shaft which, in turn, is rotatably mounted in a pair of axially aligned bores within the housing. The shaft has opposite end portions in which axially spaced substantially U-shaped annular grooves are formed to provide spaced pockets of fluid as well as a film of fluid along the shaft for maintaining a pressure balanced condition between the shaft and its associated bores as a small amount of fluid leaks thereacross to the ends of the shaft. The shaft ends are fluidly connected to an external, preferably common drain.

It is therefore an object of the present invention to provide an improved flow indicator device to indicate the rate of fluid flow therethrough.

It is also an object of the present invention to provide an improved flow indicator device of the type having a fluid responsive vane member rotatably mounted about a shaft which, in turn, is operatively coupled to an indicating means mounted exteriorly of the housing and which shaft includes a novel pressure balancing means.

Other objects, advantages, and applications of the present invention will become apparent to those skilled in the art of such fluid indicator devices when the accompanying description of an example of the best mode contemplated for practicing the invention is read in conjunction with the accompanying drawing.

Brief Description of the Drawing

The description herein makes reference to the accompanying drawing wherein like reference numerals refer to like parts throughout the several views, and in which.

Description of the Preferred Embodiments

Figure 1:
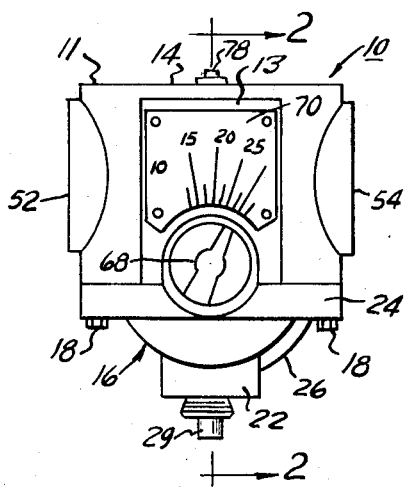
FIG. 1 is a front elevational view of a flow indicator device constructed in accordance with the principles of the present invention.

Referring now to the drawing for an understanding of the following detailed description of the present invention, an example thereof is illustrated in FIGS. 1–4 as a flow indicator device 10 comprising a housing 11 generally cylindrical in form and having opposing flat-sided portions 12 and 13 and an upper wall 14. An end bell or bowl 16 is fixed in a fluid-tight position across the lower open end of the housing 11 by means of screws 18 and a resilient O-ring seal 20.

The bowl 16 includes a cylindrical stem 22 and an annular flange 24 abutting the housing 11 through which the screws 18 extend, and an annular curved portion 26 joining the stem 22 and flange 24. The stem 22 is bored axially at 28 so as to provide communication with the interior of the bowl 16 and the housing 11. A plug 29 is insertable in a fluid-tight manner in the bore 28 and carries a pin 30 which extends upwardly into the interior of the bowl 16.

The interior, substantially semi-spherical, surface 31 of the bowl 16 is curved in a manner and for a purpose which will be described in greater detail hereinafter.

A vertical partition 32 projects perpendicularly from the wall 14 toward the bowl 16, between the opposing inner wall surfaces of the housing 11 and extends along a line drawn between the two portions 12 and 13, with the partition 32 dividing the interior of the housing 11 into two spaces 33 and 34, each of an equal volume. The partition 32 is wider at its end face 36 and is flattened along its length. A shaft 38 is rotatably mounted at each end of the housing 11 and extends closely adjacent and parallel to the end face 36. The opposite ends of the shaft 38 are respectively mounted in axially aligned receiving bores 39 and 40 in the housing 11 with the outer diameter of the opposite ends of the shaft 38 and the inner diameters of the respective receiving bores 39 and 40 being closely fitted to permit the shaft 38 to rotate therewithin, while minimizing the rate of fluid leakage through the bores 39 and 40. The opposite ends of the shaft 38 disposed in the respective receiving bores 39 and 40 are each provided with a plurality of spaced annular grooves 41, each groove 41 having a substantially U-shaped cross section. The grooves 41 are filled with fluid to provide a plurality of pressure balancing pockets to aid the shaft 38 in rotating and to prevent the shaft 38 from binding against the surfaces of the receiving bores 39 and 40. This permits the shaft 38 to be more tightly fitted to the bores 39 and 40 than heretofore possible so that the shaft 38 is in effect its own seal. Only a small amount of fluid will leak along the shaft 38 even in high pressure applications and this provides a film of fluid along the shaft which aids in pressure balancing.

A vane member 44 (FIG. 3) of a generally semi-circular configuration is carried at its straight edge by a sleeve member 45 which, in turn, is fixed to the shaft 38 by screws 35 (FIG. 4) so that the vane member 44 and the shaft 38 will rotate together.

Figure 3:
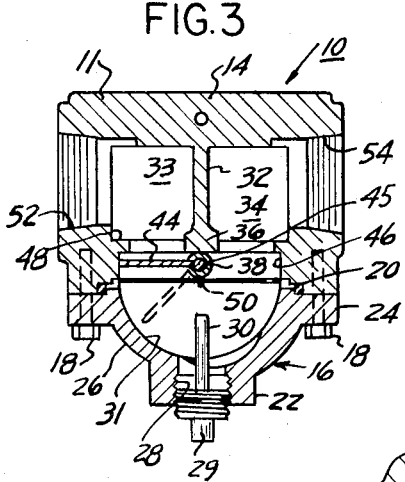
FIG. 3 is a cross-sectional view through the flow indicator device taken along line 3—3 of FIG. 2.

The housing 11 is further provided with a substantially cylindrical recess 46 (FIG. 3) registering with the substantially semi-spherical surface 31 of the bowl 16. An annular, radially inwardly extending flange portion 48 (FIG. 3) is disposed in the housing 11 intermediate the chambers 33 and 34 and the recess 46. The recess 46 is formed with a radius equal to the radius of the vane member 44 and on an axis substantially normal to and which bisects the axis of the rotation of the shaft 38 and vane member 44. Thus, when the vane member 44 is disposed in a plane perpendicular to the partition 32, as shown in FIG. 3, it extends across the semi-circular space formed by the recess 46 and partition 32 to seal off the space 33 from the interior of the bowl 16 and the space 34. The annular flange portion 48 serves as a stop to prevent the vane member 44 from rotating further into the space 33.

The radii of the vane member 44 and the substantial semi-spherical surface 31 formed in the bowl 16 are substantially equal. Thus, if the center of the surface 16 and the center of the semi-sphere circumscribed by the rotating vane member 44 were coincident, then the surface 31 and the semi-sphere circumscribed by the edge of the rotating vane member 44 would continuously separate the spaces 33 and 34 within the housing 11 and the bowl 16 into two substantially fluid-tight compartments between which fluid could not flow. To provide an opening between these two compartments, which will vary in size depending upon the position of the vane member 44, the center of the semi-spherical surface 31 is displaced outwardly from the center of the semi-sphere circumscribed by the rotating vane member 44. Both centers are located along the central axis of the cylindrical housing 11, but the center of the surface 31, which is shown at 50 in FIG. 3, is situated closer to the bowl 16. As a result, the vane member 44 substantially seals the space 33 when it is rotated to the position shown in FIG. 3. However, when it is rotated counterclockwise as viewed in FIG. 3 toward the position shown in phantom lines, the outer edge of the vane member 44 no longer abuts the inner surface 31 of the bowl 16, and a curved opening through which fluid may pass is thereby created about the semi-circular edge of the vane member 44. The size of the opening increases proportionately as the vane member 44 moves counterclockwise from its closed position toward the position shown in phantom lines in FIG. 3. The pin 30 functions to limit the counterclockwise rotational movement of the vane member 44.

The side of the housing 11 adjacent the space 33 is provided with a radially disposed inlet port 52 (FIG. 3) adapted to receive the end of an inlet conduit, not shown, through which the system fluid is directed. The opposite side of the housing 11 adjacent the space 34 is similarly provided with a radially disposed outlet port 54 adapted to be connected to an outlet conduit leading to a fluid user, not shown.

Figure 2:
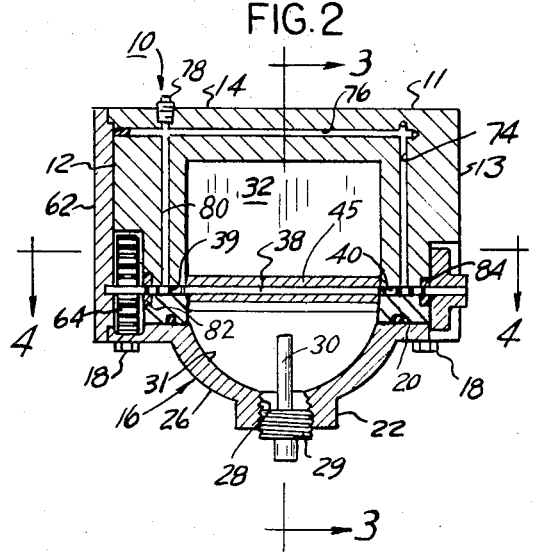
FIG. 2 is a cross-sectional view of the flow indicator device taken along line 2—2 of FIG. 1.
Figure 4:
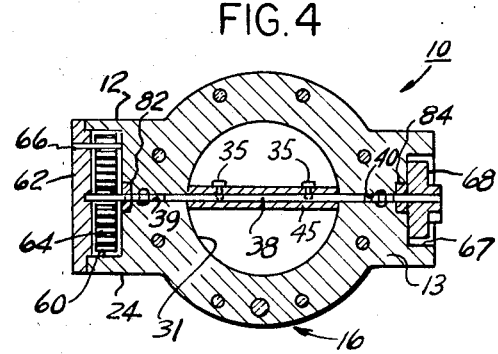
FIG. 4 is a cross-sectional view of the flow indicator device taken along line 4—4 of FIG. 2.
Figure 5:
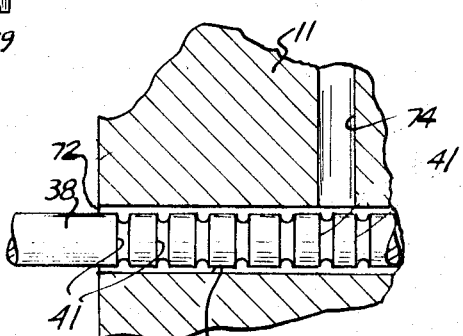
FIG. 5 is an enlarged fragmentary cross-sectional view of the flow indicator device illustrated in FIG. 2.

As can best be seen in FIGS. 2, 4 and 5, each end of the shaft 38 extends through its associated axially aligned bore 39 or 40 to the opposite side portions 12 and 13 respectively of the housing 11. The side portion 12 is provided with an annular recess 60 registering with the aligned receiving bore 39 into which the shaft 38 extends. A cap 62 closes the recess 60. A low tension coil spring 64 has one end fixed to the cap 62 by a pin 66 (FIG. 4) and an opposite end fixed to the shaft 38, so that the spring 64 provides a very slight rotational force to the shaft 38, and thus to the vane member 44, to urge the vane member 44 toward the closed position, as illustrated in FIG. 3. It is to be understood that the spring 64 is not intended to provide any measurable resisting force against fluid moving past the vane member 44, and thus the vane member 44 does not act as a valve in the sense of regulating the amount of flow, but is merely responsive to the force produced by the fluid flowing through the device 10 to assume a position which depends upon the rate of such flow. The free end of the shaft 38 is preferably journaled in the cap 62.

The opposite side portion 13 of the housing 11 is provided with an annular recess 67 (FIG. 4) which registers with the adjacent receiving bore 40. The end of the shaft 38 extends axially through the recess 67 and carries a pointer member 68 (FIG. 1). The pointer member 68 rotates with the shaft 38 and points to suitable indicia 70 disposed on the outer surface of the housing 11.

Still referring to FIGS. 2, 4 and 5, fluid from within the interior of the housing 11 will normally flow through the clearance space 72 (FIG. 5) formed between the peripheral surface of the opposite ends of the shaft 38 and the surfaces of the receiving bores 39 and 40, filling each successive annular groove 41, providing an effective, substantially uniform film along the shaft, providing lubrication and pressure balancing of the shaft to aid in eliminating friction as the shaft 38 rotates within the bores 39 and 40, and to prevent any binding of the shaft 38 within the receiving bores. Any fluid flowing through the clearance space 72 at the right-hand side of the shaft, as viewed in FIG. 2, will flow to a drain passage 74 extending upwardly toward the wall 14 of the device 10 to a second transverse passage 76 which carries the fluid leakage to a drain port 78 for connection to a reservoir, not shown. The opposite end of the shaft 38 is communicated to the drain port 78 through a second drain passageway 80. The receiving bores 39 and 40 are each provided with O-ring seals 82 and 84 (FIGS. 2,4) around the opposite ends of the shaft 38 at positions downstream from the drain passages 74 and 80, respectively, to prevent leakage into the recesses 60 and 67.

As described hereinbefore, the vane member 44 and the spring 64 offer only slight resistance to the passing fluid and thus the vane member 44 will be moved to the closed position only when flow through the device 10 is non-existent. When flow is provided through the device 10, it will act upon the vane member 44 to rotate the same in a counterclockwise direction (as viewed in FIG. 3), which rotation will be easily facilitated due to the balancing provided by the fluid filled grooves at the opposite ends of the shaft 38. As vane member 44 is so rotated, a passage is created between the curved edge of the vane member 44 and the surface 31, which increases in size as the angular rotation of the vane member 44 increases. Thus at each rate of fluid flow through the device 10, the vane member 44 will be moved to a rotational position, opening a passage between the vane member 44 and the surface 31 a sufficient area to accommodate the particular flow rate through the device. The particular configuration of the vane member 44 and the surface 31 permits a substantially equally divided graduated scale 70 to be provided and marked so that the pointer element 68 will actually indicate the rate of fluid flow through the device at any particular time.

It can thus be seen that an improved flow indicator device has been provided which is especially suitable for high pressure systems and in which a vane member is rotatably mounted upon a shaft and movable in response to fluid flowing through the device. The shaft is of a larger size than ordinarily possible so that it performs a sealing function and means are provided in the form of the annular grooves on the shaft to prevent binding of the shaft ends so that resistance to rotational movement is substantially minimized.

It is also apparent that although only one embodiment of the present invention has been described, many changes and modifications can be made thereto without departing from the spirit of the invention or the scope of the appended claims.

What is claimed is as follows:

1. A flow indicator device for a fluid system comprising a housing having an inlet port and an outlet port adapted to be connected with said system; a vane member adapted for rotation in said housing intermediate said outlet and said inlet ports; said housing being provided with interior walls having a pair of axially aligned bores and a substantially semi-spherical inner surface, said vane member having a substantially semi-circular edge rotatable adjacent said semi-spherical surface, the center of said semi-spherical surface being displaced from the center of the semi-sphere circumscribed by said circular edge upon rotation of said vane member, whereby the space between said edge and said surface varies at each rotative position of said vane member; a shaft having opposite ends rotatably mounted in said axially aligned bores; means mounting said vane member to said shaft such that said vane member rotates with said shaft about the axis of rotation of said shaft; said shaft ends each being provided with a plurality of spaced annular grooves to be filled with fluid to pressure balance said shaft ends as fluid seeps from said housing interior between said bores and shaft ends; and means indicating the position of said vane member exteriorly of said housing.

2. The flow indicator device defined in claim 1, further comprising passage means in said housing fluidly connecting the fluid leakage downstream from said annular grooves to a common drain.

3. The flow indicator device defined in claim 1 wherein said indicating means is mounted exteriorly of said housing and is coupled to one of said shaft ends, said indicating means indicating the position of said vane member and thus indicating the rate of fluid flow through said device; and sealing means disposed around said shaft between said indicating means and said annular grooves disposed on the shaft end for preventing fluid leakage from passing therebeyond.

4. The flow indicator device defined in claim 3 further comprising fluid passage means in said housing communicating with said bore between said sealing means and said annular grooves at said one shaft end for communicating said fluid leakage downstream of said annular grooves to a drain.

5. The flow indicator device defined in claim 4 further comprising spring means fixed to the other of said shaft ends to urge said valve member toward the position closing fluid flow through said device; and second sealing means disposed around said other shaft end between said spring means and said annular grooves at said other end of said shaft for preventing fluid leakage from passing therebeyond; and fluid passage means communicating said other shaft end bore between said second sealing means and said annular grooves at said other shaft end for communicating fluid leakage downstream of said last mentioned annular grooves to said drain.

6. The device defined in claim 1 wherein said grooves are of substantially U-shape in cross section.

* * * * *

UNITED STATES PATENT OFFICE
CERTIFICATE OF CORRECTION

Patent No. 3,685,354           Dated August 22, 1972

Inventor(s)    Nils O. Rosaen

It is certified that error appears in the above-identified patent and that said Letters Patent are hereby corrected as shown below:

Column 4, line 4, after "compartments" delete ", (comma)".

Column 5, line 53, after "size" insert --with respect to the bores 39 and 40--.

Column 5, line 53, after "than" insert --would--.

Column 5, line 53, after "ordinarily", insert --be--.

Column 6, line 14, delete "circular" and insert --semi-circular--.

Signed and sealed this 30th day of January 1973.

(SEAL)
Attest:

EDWARD M. FLETCHER, JR.          ROBERT GOTTSCHALK
Attesting Officer                  Commissioner of Patents